3,733,242
DECORATIVE LAMINATE COATED ON ITS BACK-MOST SURFACE WITH A CARBOXYLATED STYRENE-BUTADIENE POLYMERIC RUBBER BASED ADHESIVE AND PROCESS FOR INSTALLING THE SAME
Walter Thomas Davis, Cincinnati, Ohio, assignor to Formica Corporation, Cincinnati, Ohio
No Drawing. Filed Sept. 7, 1971, Ser. No. 178,495
Int. Cl. B32b 3/26; E04b 2/00
U.S. Cl. 161—160
10 Claims

ABSTRACT OF THE DISCLOSURE

A process which bonds a decorative laminate to a substrate comprising coating the backmost flat surface of the laminate with certain quantities of a carboxylated styrene-butadiene polymeric rubber, drying the adhesive, reactivating the adhesive and installing the laminate by pressing against the substrate to which the laminate is to be attached.

BACKGROUND OF THE INVENTION

For many years decorative high pressure laminates have been used as a surfacing material for walls, partitions, table tops, counter tops, furniture, doors and other similar applications. These decorative laminates have been produced by a plurality of prior art processes. In making such laminates it is conventional to utilize a plurality of resin impregnated core sheets generally composed of kraft paper which have been impregnated with a thermosetting resin and more particularly as a general rule with a thermosetting phenolic resin. When the kraft has been impregnated with a thermosetting resin, the sheets are dried and cut to appropriate size. Thereupon, a plurality of these resin impregnated sheets are stacked in a superimposed relationship. The number of plies in the stack will depend upon the ultimate intended use of the laminate. For most purposes the number of these core sheets will total about 6 to 9. For decorative laminates there is then placed on the stack of core sheets a decorative sheet which is generally a sheet of alpha-cellulose paper bearing a printed design or a light color and impregnated with a noble thermosetting resin (see U.S. 3,373,068 and 3,418,189) which is not subject to any significant darkening upon the application of heat. Resins for the decorative sheets are the aminotriazine resins and additionally the unsaturated polyester resins, the epoxy resins and the like.

It is generally desirable when making decorative laminate to make use of a protective overlay sheet which is similar to the decorative sheet but generally devoid of design and in the final laminate is transparent. The laminates produced are heat and pressure consolidated to a unitary structure in which the press plate is a polished stainless steel plate. Such an approach produces a very smooth surface laminate with a glossy finish. Other techniques are used to produce laminates with a smooth surface but with a satin or brush textured effect. More recent techniques permit the manufacture of laminates with a three dimensional design on the surface-like slate.

These decorative laminates are nearly always bonded with an adhesive to a rigid substrate such as plywood, particle-board, gypsum bond, foam, plastic, metal, cement, cement asbestos board or cement block which are typical substrates for application such as partitions, walls, panels, doors, cabinets, table tops, counter tops, desks, furniture and many other uses.

Over the years the adhesives that have normally been used in bonding the aforementioned decorative laminate to substrate consist essentially of rigid, semi-rigid and the elastomeric types that have bonding properties which are compatible with the heat and pressure limitations of the laminate and capable of resisting humidity and temperature variations and induced stresses inherent in a bonded laminate to substrate assembly, particularly in applications such as bathrooms and kitchens.

The rigid setting adhesives are those based usually on either urea-formaldehyde resins or resorcinol-formaldehyde resins and they produce excellent bonds and adequate water resistance. The adhesive is applied either to the back side of the laminate or the coating is applied to the substrate. (They are usually hot set but can be used at room temperature.)

The assembly is then either clamped or inserted in a veneer press and low pressure of approximately 25 p.s.i. is applied. These adhesives are considered "hot set" and will cure to excellent bonds by the application of heat of about 200° F. for 7 to 10 minutes. In the absence of heat, for example at room temperature conditions, satisfactory workable bonds are achieved under pressure in about 7 to 12 hours. "Workable" bond means that the panel may be trimmed, sawed and routed.

The semi-rigid adhesives encompass such materials as polyvinyl acetate emulsions, polyvinyl alcohol, epoxies and others.

Like the rigid type adhesives discussed above, the adhesive is either coated on the back of the laminate or on the substrate to be covered. Excellent bonds are achieved after subjecting the veneered assembly to clamp pressures or veneering equipment pressure for a period of about 30 minutes up to about 8 hours at room temperature.

Elastomeric adhesives and more specifically the "contact" type, are a solution with rubbery polymers; produce a workable bond almost instantly upon contact. Their ability to be processed rapidly and produce bonds without mechanical equipment justifies their use. Usually, pressure from a hand roller is all that is required to achieve excellent bonds. The use of "contact" type adhesive has significantly enlarged the scope of application such as had not been possible heretofore, namely, on-site applications such as surfacing for walls, and more particularly, high humidity areas such as bathrooms, kitchens and the like. On-site application techniques are common today for remodeling as well as new construction. However, the "contact" adhesives have a major shortcoming. They are hazardous to use because of their composition which consists of neoprene in a solvent blend of toluene, methylethylketone acetone and petroleum spirits. When the adhesive is applied to the surfaces to be bonded and then permitted to air dry, allowing the solvent to evaporate, extreme caution must be exercised because of the flammable, toxic nature of the evaporating solvent.

Attempts have been made to overcome these problems by using aqueous based contact type adhesives but have proven inadequate because of extremely long drying times and inadequate bond to especially hard surfaces such as ceramic materials.

FIELD OF THE INVENTION

The present invention is in the field of the installation of decorative laminates on a substrate to which the laminate is to be permanently attached. I have found an adhesive system by which decorative laminates and decorative laminate surfaced panels can be permanently bonded to rigid substrates in production or in on-site locations without the hazards of toxicity and flammability and with the ability to allow the positioning of the laminates before bonding by the application of pressure. In recent work with decorative laminate surfaced panels backed with a semi-rigid polystyrene foam sandwiched between sheets of wet strength kraft paper, the panels were installed over water resistant gypsum board, water resistant plywood and ceramic tile wall substrates with a neoprene elastomeric adhesive. A part of my invention concept resides in the preparation of these laminates for installation some considerable period of time in advance of shipment and ultimate installation in the selected location. In order to accomplish this delayed installation technique, the decorative laminate is coated on its back most flat surface with a uniform layer of a carboxylated styrene-butadiene polymeric rubber based adhesive composition in an amount sufficient to deposit between 3.5 and 8 grams per square foot of said adhesive, dry weight, and, preferably, from about 4.5 to about 5.5 grams per square foot, same basis. After drying the adhesive, a protective film is used to cover the dry adhesive layer until it is desired to reactivate the adhesive. Whereupon, the protective film is removed and the dry adhesive layer is reactivated immediately before installation by contacting said dried adhesive. Whereupon, the protective film is removed and the dry adhesive layer is reacted immediately before installation by contacting said dried adhesive coating with an adhesive activator solution containing from about 10% to about 13%, solids basis, of a carboxylated styrene-butadiene polymeric rubber solution. The present invention is also in the field of decorative laminates which are prepared for ultimate installation in which the backmost flat surface is coated with a uniform layer of a carboxylated styrene-butadiene polymeric rubber based adhesive in the stated quantities and when said adhesive layer has dried, it is covered with a removable temporary protective film.

DESCRIPTION OF THE PRIOR ART

The instant applicant is aware of the plurality of adhesive compositions which may be used in the practice of his invention, particularly those shown in the U.S. Pats. 2,880,186 and 3,466,256, which patents are incorporated herein by reference.

SUMMARY OF THE INVENTION

This invention relates to a process for bonding a decorative laminate to a substrate comprising (1) coating the backmost flat surface of the laminate with a uniform layer of a carboxylated styrene-butadiene polymeric rubber based adhesive in an amount sufficient to deposit from about 3.5 to 8 grams per square foot of said adhesive, dry weight, (2) drying the adhesive, (3) solvent reactivating the coating immediately before installation by contacting said coating with an adhesive activator solution containing from about 10% to about 13%, solids basis, of a carboxylated styrene-butadiene polymeric rubber and (4) installing the laminate by pressing against the substrate to which the laminate is to be attached.

This invention further relates to a decorative laminate coated on its backmost flat surface with a uniform layer of a carboxylated styrene-butadiene polymeric rubber based adhesive in an amount varying between about 3.5 and 8 grams per square foot of said adhesive, dry weight and in which said adhesive layer, in a dry state, is covered with a removable temporary protective film.

The following is a more detailed description of the process of the present invention. One can apply uniformly a coating of carboxylated styrene-butadiene rubber based adhesive preferably in an amount sufficient to provide between about 4.5 and 5.5 grams per square foot of said adhesive, dry weight, on to the kraft paper surface of a panel assembly consisting of a 1/16" decorative laminate bonded to a 1/8" sandwich polystyrene foam core. The core is surfaced on both sides with high quality wet-strength kraft paper. The coated panel is allowed to dry to a tack free condition and a protective film such as a film of polyethylene is applied to the dried coated surface. If desired, one could use as little as 3.5 grams per square foot of the adhesive, dry weight but, below this level, questionable erratic bonds would result. On the other hand, coatings of 8 grams are satisfactory but are unnecessary for effective bonding and the cost of the additional adhesive raises the question of the economics and makes the use of amounts in excess of 8 grams an unnecessary additional expense.

It is preferred to apply the adhesive coating to the backmost flat surface of the laminate by spraying in order to achieve tri-dimensional pebble-like surface, although other methods of application could be used such as roller coating, graining, brush coating and the like.

The preferred carboxylated styrene-butadiene adhesive composition is one which is commercially available from PPG Industries and is marketed by them to the identification of MK–88C (yellow) as described in the U.S. Pat. 3,466,256. The adhesive is approximately 30% solids and contains, as the solvent medium, a mixture of hexane and heptane. After the solvent has evaporated, the adhesive is left remaining on the laminate as a substantially uniform layer and, if the laminate is not to be installed immediately in its ultimate location, it should then be covered with a removable film which protects the adhesive layer temporarily during storage and shipping.

The laminate containing the dried adhesive coating is protected against damage during panel movement, distribution, storage or machining such as cutting to the appropriate size by the application of the temporary protective cover. Among the protective covers that may be used are films of polypropylene, polyethylene, specially prepared parchment papers and similar release type films can be used, but it is preferred that a two mil polyethylene plastic film be used. The polyethylene plastic film be used The polyethylene film, "lightly tacked" to the dried adhesive coating on the panel by the use of a pinch roller or other similar impingement methods such as hand roller, hand wipe or the like.

When the laminate is to be installed, the temporary protective film is removed and the adhesive layer can be reactivated immediately for assembly bonding. To accomplish this, the protective cover is removed from the adhesive coating and 1 to 2 grams per square foot of residual dry weight adhesive activator solution comprising from 10% to 13% solids basis of a carboxylated styrene-butadiene polymeric rubber in from 90% to 87% of 1,1,1-trichloroethane is applied to the adhesive coating by use of a short nap mohair paint roller or brush or similar spreading device. The short nap paint roller will deposit the adhesive activator solution in a quantity sufficient to reflect a rubber adhesive deposit of about one to two grams per square foot, dry weight. Other solvents can be used as a solvent medium of the activator solution such as toluol, hexane, heptane and the like, but the 1,1,1-trichloroethane is preferred because it is the least toxic of the chlorinated solvents and is non-flammable. If one used solvent only, namely one containing no rubber adhesive, or used a solution of the solvent with up to about 9% of the carboxylated styrene-butadiene polymeric rubber adhesive, the base adhesive coating will be reactivated but the effective bonding time is materially reduced to an impractical level. On the other hand, if 14% or more of the carboxylated styrene-butadiene rubber adhesive solids is used in the solvent, the activating solution has a reduced and questionable shelf life. In order to determine when the panel is ready for bonding to its permanent substrate, the adhesive coating reactivated by the adhesive reactivator ceases to transfer as a wet film when lightly touched with a kraft paper or finger, but the coating is still tacky.

After the adhesive layer has been reactivated, the panel is ready to be positioned on its permanently located substrate. If the panel requires any repositioning because of poor alignment, it can be done readily. This repositioning factor is unique with this type of adhesive and is unlike contact adhesive in which a panel and substrate coated with such contact adhesive coatings cannot be repositioned once the adhesive coatings on the panel and the substrate are touched together. In the present situation, after the panel has been positioned exactly on the substrate, pressure is then applied to the decorative face of the panel by hand or by similar means which creates a firm momentary pressure. The application of this pressure causes a transfer of a portion of the adhesive coating to the rigid substrate. Now, both the panel and the substrate are "wet" or coated with the adhesive and a permanent bond is thereby achieved. If the adhesive coating is too "wet" when the pressure is applied, a delamination can occur from panel stress. This is corrected readily by reapplication of firm momentary pressure. On the other hand, if the adhesive coating is too dry when firm momentary pressure is applied, no adhesive transfer will take place and no bond will be established. In this instance, recoating with the activator solution is necessary to achieve a bond. The permanency of the bond between the panel and the rigid substrate has, is and can be verified with laboratory accelerated tests. These tests that prove the permanency of the bond are set forth hereinbelow:

Panel adhesion screening test

Panels bonded by the activator method are bonded in and subjected to less than 10% RH at 75°±5° F. and 85% RH at 75°±5° F. The panels remain in their respective area humidity conditions for 14 days and then transferred to the opposite humidity condition for 14 days. This 28 day exposure creates internal stresses in the laminate surfaced panels. The internal stresses of the panels must be restrained by the adhesive so that the panel remains tightly bonded to the substrate for the entire 28 day exposure period.

Dip tank test

Panel samples are bonded to rigid substrates by the activator method and exposed to 150° F. water bath for 15 minutes and to ambient room temperature for 45 minutes a cycle. The cycle is repeated continuously for 96 hours. A panel sample must remain tightly bonded to the substrate during the 96 hour cycling.

Shower stall test

30" x 60" panels are bonded by the activator method and subjected in a working shower stall to 15 minutes of 150 F. water and 45 minutes of drying at ambient room temperatures on a continuous cycle basis for 96 hours. Panels must remain tightly bonded to the substrate for this 96 hour period.

Empirical test

12" x 12" panel samples are bonded by the activator method to rigid substrates at immediate and five minute intervals. These are immediately forceably delaminated from the substrate to determine the totality of adhesive transfer. A minimum of 60% of the substrate must receive transferred adhesive coating to be acceptable.

Heat lamp test

11" x 11" laminate samples are bonded by the activator method to rigid substrates and subjected for 2 hours to 140° F. temperature. A lifting of $\frac{1}{32}$" at the edge is acceptable at the end of the two hour cycle.

In order that the concept of the present invention may be more completely understood, the following examples are set forth. These examples are set forth primarily for the purpose of illustration and any specific enumeration of detail contained herein should not be interpreted as a limitation on the case, except as is indicated in the appended claims.

EXAMPLE 1

A commercially available carboxylated styrene-butadiene rubber adhesive solution is sprayed in a uniform coating to a pebble-like appearance with a dry weight of 4.5 grams per square foot on to the kraft paper surface of a panel assembly consisting of a $\frac{1}{16}$" decorative laminate bonded to a $\frac{1}{8}$" sandwich of polystyrene foam core faced on both sides with kraft paper. The styrene butadiene rubber adhesive is allowed to dry tack free and is then protected from dirt, dust, etc., by a 2 mil polyethylene film. The adhesive coated panel is then machined to desired dimensions required for bonding in a defined position to a rigid ceramic tile substrate forming one wall of a shower stall. The polyethylene is removed and the styrene butadiene rubber adhesive coating is wetted and, thereby, reactivated by the paint roller application of a solution of 10% solids of the carboxylated styrene butadiene rubber and 90% 1,1,1-trichloroethane.

The paint roller applied solution of activator will have a residual dry weight of 1½ to 2 grams. When the reactivated base adhesive ceases to transfer as a wet film when lightly touched, the panel is positioned on the substrate and a bond established by hand roller pressure on the decorative face of the laminate. The remaining two walls of the shower stall are surfaced with laminate surfaced panels following the aforementioned procedure. The bonded panels then are subjected to 150° F. water from a shower head for 15 minutes, allowed to dry for 45 minutes and the cycle repeated continuously for 100 hours. The styrene butadiene rubber adhesive bonded panels remain tightly bonded to the ceramic tile substrate through and to the conclusion of the test, thereby proving the permanency of the bond.

EXAMPLE 2

Example 1 as repeated in all essential details for coating and protecting $\frac{1}{16}$" decorative laminate surfaced panels with the exception that the rigid substrate of the shower stall to be bonded to is water resistent gypsum board. Again, after reactivation with the activator solution and bond established by hand roller pressure, the bonded panels are subjected to the 15 minutes of 150° F. water exposure and 45 minute drying cycle for 100 hours. These panels remain tightly bonded to the water resistant gypsum board throughout and to the conclusion of the test.

EXAMPLE 3

Examples 1 and 2 are repeated in all essential details with the exception that water resistant plywood is used as the rigid substrate. Again, the bonded panel is tested in the Shower Stall Test for 100 hours with no detectable failure of the bond.

EXAMPLE 4

Example 1 is repeated in all essential details insofar as the coating procedure is concerned, however, a $\frac{1}{16}$" decorative laminate without foam core is coated with the carboxylated styrene-butadiene rubber adhesive on the non-decorative side. Again, as in the previous examples, the adhesive coating is protected with polyethylene 2 mil film for laminate moving and machining purposes. The laminate is machined to the configuration and dimension of the plywood substrate. The laminate adhesive coating is reactivated with the activator, after the polyethylene film is removed. The laminate is positioned on the plywood and bond is established with hand roller pressure applied to the decorative surface of the laminate. The resulting laminate surfaced panel is suitable for horizontal or vertical applications. In this example, the panel is sectioned in to test samples and these samples are subjected to the environment tests previously described. The permanency of the bond is proven by the fact that the laminate does not delaminate from the polywood during these tests.

COMPARATIVE EXAMPLE 5

Example 1 is repeated in all essential details with the exception that 2 grams dry weight of styrene butadiene rubber adhesive is sprayed in a pebble-like coating on the kraft paper back of the laminate surfaced foam cored panel. In this instance the laminate panel bonded by reactivation to ceramic tile failed to remain bonded in the Shower Stall Test.

COMPARATIVE EXAMPLE 6

In this example nitrile phenolic adhesive was spray coated at 4.5 grams per square foot dry weight in a uniformly pebbled coating to the kraft paper side of 1/16" decorative laminate surfaced polystyrene sandwiched with kraft paper on 2 surfaces. The adhesive film was protected for movement and machining as in Example 1. The adhesive coating was reactivated after machining and removal of protective film with a solution of 10% nitrile phenolic and 90% 1,1,1-trichloroethane. Bond was established after the adhesive coated panel was positioned over water resistant plywood by hand roller pressure to the decorative surface of the panel. The assembly was subjected to the Shower Stall Test previously described and failure by edge delamination was noticed in 24 hours and became progressively worse.

It has been indicated herein above that the preferred adhesive activator solution is 1,1,1-trichloroethane because it is the least toxic of the chlorinated solvents and is also non-flammable. It has been further indicated that other solvents can be used as the solvent medium of the activator solution such as hexane, heptane and the like. Additionally, one can use aromatic solvents such as toluene, cyclohexane, naphtha and the like. Less desirable nonflammable solvents because of their toxicity, but equally effective chlorinated solvents are vinylchloride, methylene chloride and trichloroethylene.

I claim:

1. A process for bonding a decorative laminate to a substrate comprising (1) coating the back most flat surface of the laminate with a uniform layer of a carboxylated styrene-butadiene polymeric rubber based adhesive in an amount sufficient to deposit from about 3.5 to 8 grams per square foot of said adhesive, dry weight, (2) drying the adhesive, (3) solvent reactivating the coating immediately before installation by contacting said coating with an adhesive activator solution containing from about 10% to about 13%, solids basis, of a carboxylated styrene-butadiene polymeric rubber and (4) installing the laminate by pressing against the substrate to which the laminate is to be attached.

2. The process according to claim 1 in which the decorative laminate is mounted on a polystyrene foam core which is surfaced on both of its broad surfaces with kraft paper.

3. The process according to claim 1 in which the layer of adhesive is applied uniformly on said laminate in an amount sufficient to provide from about 4.5 and 5.5 grams per square foot dry weight.

4. The process according to claim 2 in which the layer of adhesive is applied uniformly on said laminate in an amount sufficient to provide from about 4.5 to 5.5 grams per square foot dry weight.

5. The process according to claim 1 in which a temporary protective film is used to cover the dry adhesive layer until the time of reactivating the adhesive whereupon the protective film is removed.

6. The process according to claim 2 in which a temporary protective film is used to cover the dry adhesive layer until the time of reactivating the adhesive whereupon the protective film is removed.

7. A decorative laminate coated on its backmost flat surface with a uniform layer of a carboxylated styrene-butadiene polymeric rubber based adhesive in an amount varying between about 3.5 and 8 grams per square foot of said adhesive, dry weight and said adhesive layer, in a dry state, is covered with a removable temporary protective film.

8. A decorative panel comprising a decorative laminate bonded to a sandwich of polystyrene foam surfaced on both of its broad surfaces with kraft paper, the back most kraft paper surface of said sandwich is coated with a uniform layer of carboxylated styrene-butadiene polymeric rubber based adhesive in an amount varying between about 3.5 and 8 grams per square foot of said adhesive, dry weight, wherein said adhesive layer, in a dry state, is covered with a removable temporary protective film.

9. A decorative laminate according to claim 7 in which the layer of adhesive is present in an amount varying between about 4.5 and 5.5 grams per square foot dry weight.

10. A laminate according to claim 11 in which the layer of adhesive is present in an amount varying between about 4.5 to 5.5 grams per square foot dry weight.

References Cited

UNITED STATES PATENTS

| | | | |
|---|---|---|---|
| 3,616,146 | 10/1971 | Gabet | 161—167 |
| 3,620,366 | 10/1971 | Parkinson et al. | 161—167 |
| 3,658,744 | 4/1972 | Brindell et al. | 161—62 |
| 3,681,190 | 8/1972 | Dahlquist | 161—167 |

WILLIAM J. VAN BALEN, Primary Examiner

U.S. Cl. X.R.

156—71, 326; 161—167, 247, 406